May 19, 1959 J. RUETTIGER 2,887,010
NEUTRAL DENSITY FILTERS
Filed Sept. 9, 1957 2 Sheets-Sheet 1
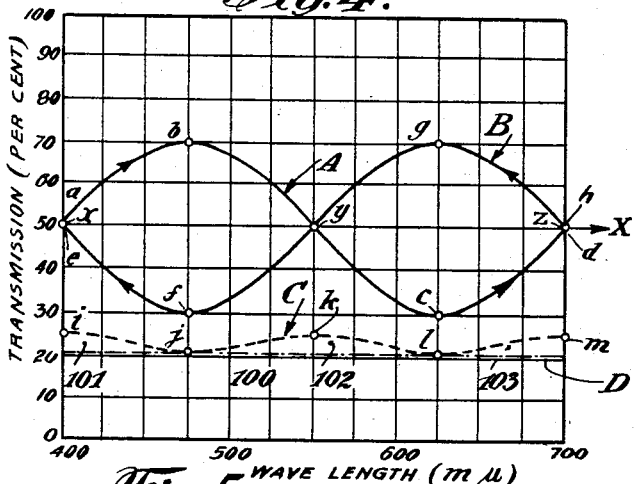
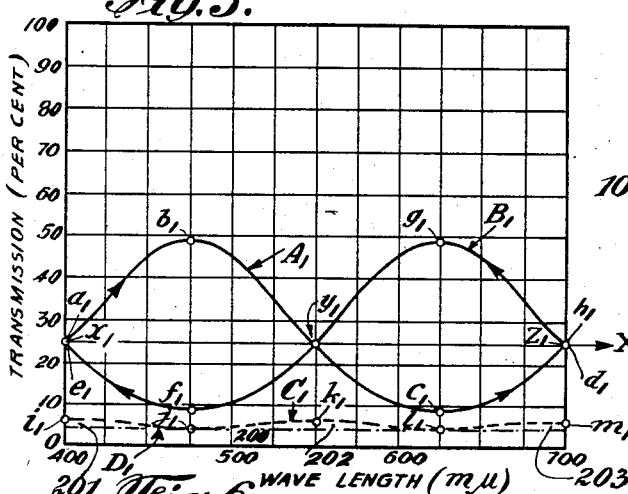
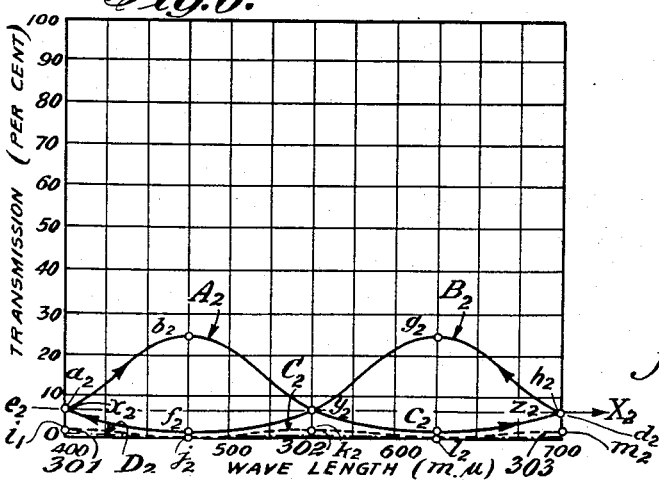
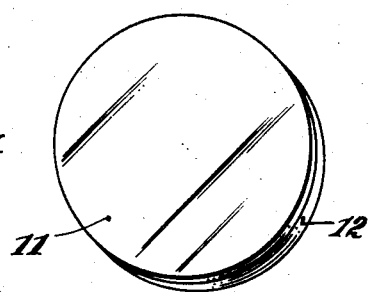
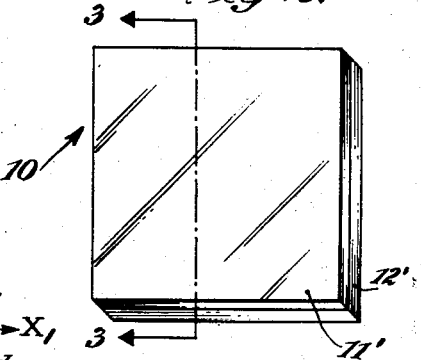
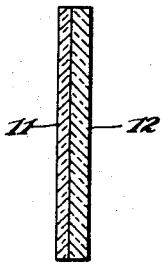
INVENTOR
Justin Ruettiger
BY C. P. Goepel
his ATTORNEY

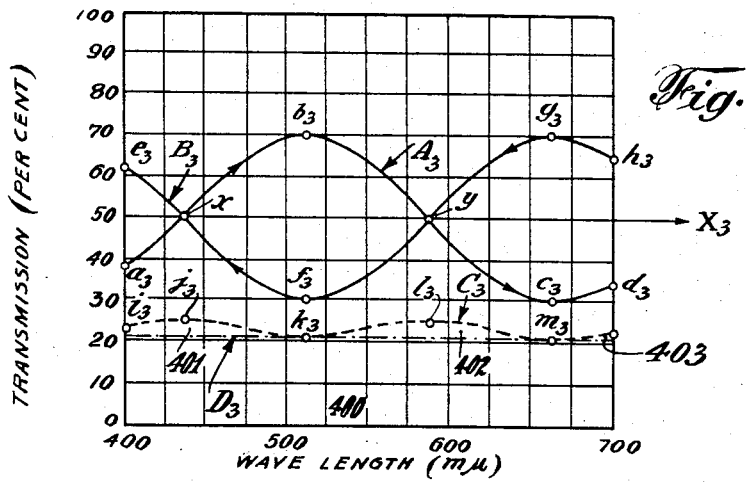
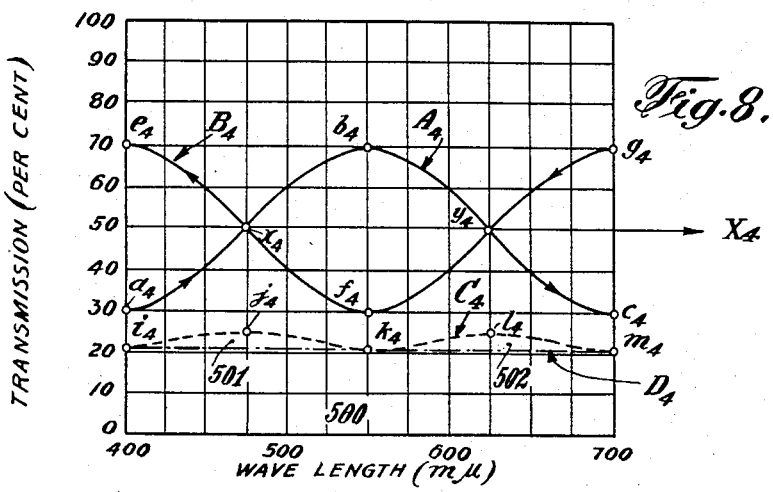
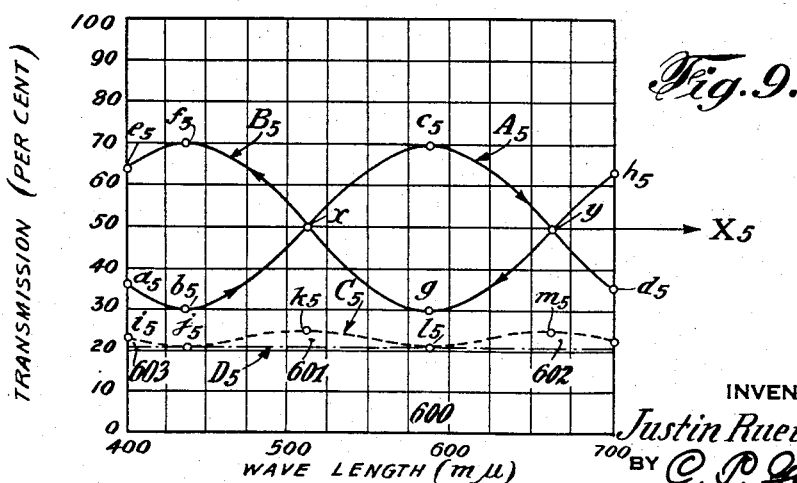

United States Patent Office 2,887,010
Patented May 19, 1959

2,887,010

NEUTRAL DENSITY FILTERS

Justin Ruettiger, New York, N.Y.

Application September 9, 1957, Serial No. 682,686

10 Claims. (Cl. 88—112)

The present invention relates to filters for radiant energy, and more particularly to neutral density filters of the absorbent-transmittent type which reduce achromatic radiant energy over a region of its spectrum nearly non-selectively and substantially without reflecting or scattering of the energy. This application is a continuation-in-part of my copending application Serial No. 500,371, filed April 11, 1955, and now abandoned.

The principal object of the invention is to provide a filter for nearly non-selective retardation of achromatic light across the visual spectrum.

Another important object of the invention is to provide a filter which practically non-selectively decreases achromatic light by utilizing media whose spectrophotometric transmission curves simulate full sinusoidal or sine waves.

A further object of the invention is to provide a predeterminable neutral density filter which may be applied for visible as well as invisible rays.

A still further object of the invention is to provide a neutral density filter by making use of the stimuli of maxima of light transmission in the parts of the visual spectrum which are complementary to each other in such manner that the stimuli interfere with and neutralize each other.

An additional and more specific object of the invention is to provide a neutral density filter for cameras and other light controlling equipment for neutral transmission of achromatic light and to a lesser extent of chromatic light.

A yet further object of the invention is to provide a neutral density filter whose elements may be used separately as complementary color filters of substantially equal colorimetic purity and density.

For the visual spectrum, the above objects are achieved by the provision of a filter consisting of two colored, translucent, isotropic media of different hues with characteristic spectro-photometric curves which simulate full sinusoidal or sine waves across a transmission field of the visual spectrum and which are inverted with respect to and intersect each other at half-wave intervals in the given transmission field, the waves being displaced with respect to each other the distance equaling one full sinusoidal or sine wave and being superimposed and combined in such manner that the resultant transmission curve of the filter outlines two, or the equivalent of two, substantially equal maxima of light transmission over the visual spectrum with the dominant wave lengths of the maxima spaced apart the distance equaling one-half the length of the simulated sinusoidal or sine waves.

While the novel filter may be advantageously employed for retardation of radiant energy outside the visual spectrum, that is, of energy having a wave length either below 400 millimicrons or above 700 millimicrons, it will find most frequent use in certain optical instruments, especially as filter for cameras and light controlling equipment in connection with multicolor projecting, exposing and printing. The novel device employs only two, or the equivalent of only two, filter elements which provide complementary stimuli in the visual spectrum of practically equal colorimetric purity and density. This is particularly important for projecting, dividing or combining again all the colors of the spectrum with a high degree of correctness and renders the filter useful in color television and color printing.

The known neutral density filters for the visual spectrum consist of smoke glass, multiple layers of colored transparent material, thin interference films of the reflecting-transmitting type, mixtures of dyes with colloidal carbon in gelatine, certain types of polarizers, colloidal black silver in gelatine, or fine wire screens. These filters are more or less neutral to the light of the visual spectrum which extends, as is known, from the wave length of 400 millimicrons to that of about 700 millimicrons. However, not all such known neutral density filters are suitable for retardation of light or images in connection with optical instruments.

Filters which consist of fine wire screens and those containing colloidal black silver or colloidal carbon tend to scatter the light and to thereby obscure fine details of optical images; therefore, they are not satisfactory for use with image-forming or image-projecting instruments.

Filters composed of thin interference films of the reflecting-transmitting type are unsuitable in many instances because of strong reflection of light (about 50%) at their surfaces, which should be avoided in most optical instruments where a neutral density filter is used.

Polarizers deal with selected and directed light, whereas the present invention is concerned with neutral density filters for ordinary light. Thus, only certain of the known neutral density filters are in the same category with the filter of this invention, i.e., those which are suited for transmission of fine details of optical images. Known filters with such characteristics are smoke glass; multiple layers of colored transparent material; and mixtures of dyes in gelatine, plastics and the like. In the range of the visual spectrum, the best available filters with substantial light retardation (25% or more) are neutral to achromatic light only to a certain degree, i.e., up to 94%, which is not quite satisfactory for critical performance.

In the manufacture of smoke glasses for use in known neutral density filters, metal salts are introduced into the melt in suitable quantities to fill out the bands of the visual spectrum to the best extent possible in order to obtain a nearly straight line of transmission. As above stated, the best available smoke-glass neutral density filters with a light retardation of 25% or more are neutral to achromatic light to about 94%, compared with 99% for my novel filter. Thus, my filter for neutral retardation of achromatic light in the visual spectrum may be constructed to a substantially higher degree of perfection, its neutral retardation being based not on a straight line of transmission, as in known neutral density filters, but on a curve of transmission having two, or the equivalent of two, complete maxima of light transmission in complementary parts of the visual spectrum. Because the stimuli of maxima of the transmission curve are complementary, they interfere with and cancel each other, and cause the filter to be of neutral density for achromatic light. Moreover, the feeble selective retardation of chromatic light by the novel filter is of advantage in color film exposing when feeble deviations of achromatic light exist.

Neutral density filters which consist of multiple layers of colored transparent material are based on the elementary knowledge that two media of the so-called complementary colors, i.e., red and green or blue and yellow; or three media of the primary colors such as blue, green and red; or even four colors, when superimposed constitute a filter of more or less neutral density because their combination appears to be grayish or black. Yet these are not high quality neutral density filters because of the non-complementary residuals of maxima of transmission, which also applies to mixtures of dyes in gelatine or the like, especially if no colloidal carbon is added thereto. Thus, the neutral transmission of such known filters is rather unpredictable because it depends to a large extent on experimentation.

The neutral transmission or light retardation of my filter is based on the recognition that when two truly complementary batches of chromatic light—equal in area, intensity and colorimetric purity—are so placed with respect to each other as to overlap, form achromatic or neutral light. This applies to the residuals of transmission of the novel filter wherein two, or the equivalents of two, such complementary residuals as maxima of light transmission are provided in the resultant light transmission curve of two combined colored translucent media.

It may also be said that if one transforms part of radiant energy of the visual spectrum into two complementary stimuli of equal colorimetric purity and equal intensity by means of two selectively absorbent media, and causes the stimuli to be in opposition to each other, that part of the energy which forms said stimuli may be retarded non-selectively. While the realization of a truly perfect neutral density filter, even if constructed in accordance with my invention, is not feasible due to certain properties of media involved, the neutral transmission of the novel filter may, as above stated, be as high as 99% and the filter is thus far superior to those of known construction.

In accordance with the present invention, the neutral density filter consists of two selectively absorbent media which are selected from materials whose spectrophotometric transmission curves simulate full sinusoidal or sine waves in the transmission field of a given spectral region. By sinusoidal waves are meant exponentially damped and undamped curves which more or less closely approach a sine wave. The simulated sine wave of one medium has a path difference of one full wave length with respect to the simulated sine wave of the other medium in the given transmission field, the waves being reversed in phase and direction. The resultant transmission curve of the two superimposed media is of different transmission values which represent stimuli equal to two symmetric complementary maxima of transmission, the latter being substantially equal in area and therefore causing the filter to be neutral for achromatic radiant energy since the equal but complementary stimuli interfere with and neutralize each other.

The spectrophotometric curve of a medium which is in the form, and equals the length, of one full exponentially undamped sine wave across a given transmission field, the X-axis of such wave-curve being parallel with a line of neutral transmission of said field, may also be interpreted as meaning that the medium filters and transforms a certain amount of the incident achromatic radiant energy into stimuli in a certain part or parts—depending on the position of the sine wave in the transmission field—of the spectral region involved, and absorbs an equal amount in the complementary part or parts thereof.

A different medium with another spectrophotometric curve in a similar transmission field, which curve is similar but displaced in time one full wave length and in opposition with respect to that above described, again filters and transforms a certain amount of the incident achromatic radiant energy into stimuli, yet in the opposed or counterparts of the given spectral region.

When superimposed in one of said transmission fields, the two spectrophotometric curves of such media form a curve pattern much like that of one full stationary wave, and the two media necessarily cancel the stimuli they caused by their individual selective absorption if the incident radiant energy is that of a continuous spectrum.

The advantages of such construction are in that the filter may be balanced to a higher degree of neutral transmission than in known smoke-glass or multiple-layer filters; that the filter is predeterminable and may be applied for visible as well as invisible rays; that it serves as a high-grade neutral density filter for achromatic light and as a filter of substantially neutral density with feeble selective retardation for chromatic light; and that its components or filter elements may be used separately as complementary color filters of substantially equal colorimetric purity and density.

Other objects of the invention, as well as additional advantages and attributes of the novel filter and its elements will become apparent in the course of the following description of the embodiments selected for illustration in the accompanying drawings, and the scope of the invention will be finally pointed out in the appended claims.

In the drawings,

Fig. 1 is a perspective view of one form of the improved filter consisting of two media with circular contours;

Fig. 2 is a similar view of a modified filter consisting of two juxtaposed plates of different thicknesses with square contours;

Fig. 3 is a section taken on line 3—3 in Fig. 2;

Fig. 4 shows a light transmission field of the visual spectrum with the spectrophotometric curves of two media of given thicknesses and different colors plotted and superimposed therein, as well as the resultant transmission curve of the filter;

Fig. 5 illustrates in a similar transmission field the spectrophotometric curves and the resultant transmission curve of two media whose thickness is twice that of media whose spectrophotometric curves are shown in Fig. 4;

Fig. 6 is similar to Fig. 5, but the thickness of media whose spectrophotometric curves are plotted in the transmission field is twice that of media represented in Fig. 5; and Figs. 7 to 9 show three other transmission fields with spectrophotometric curves and resultant transmission curves of media which are different in color from those shown in Figs. 4 to 6.

In Figs. 1 and 2, there are shown two light filters each consisting of two media 11, 12 and 11', 12', respectively, the media being selected in accordance with the requirements for the improved neutral density filter, i.e., their spectrophotometric light transmission curves simulate full sinusoidal or sine waves across the visual spectrum, the waves being reversed in phase and direction and being displaced in time one full wave length with respect to each other over the visual spectrum.

It will be noted in Fig. 3 that the juxtaposed media 11', 12' shown in Fig. 2 are of different thicknesses to balance their color stimuli.

In Fig. 4, the transmission curve A of a given (blue) medium, for example, medium 11 of Fig. 1, indicates that its transmission of the incident light is 50% at the wave length of about 400 millimicrons, as at $a$ (losses due to reflection are not considered here), increases to 70% at the wave length of about 475 millimicrons, as at $b$, and then recedes to 30% at the wave length of about 625 millimicrons, as at $c$, whereupon it again increases to 50% at the wave length of about 700 millimicrons, as at $d$. Thus, the curve A closely approaches a full sine wave across the visual spectrum.

The transmission curve B of a different (orange-brown) medium, e.g., medium 12 in Fig. 1, is opposed in direction to that of curve A (as is indicated by the arrows) and intersects the latter at half-wave intervals. Thus, the medium with the spectrophotometric curve B transmits 50% of the incident light at the wave length of about 400 millimicrons, as at *e*, the percentage of transmission decreasing to 30% at the wave length of about 475 millimicrons, as at *f*, increasing thereupon to 70% at the wave length of about 625 millimicrons, as at *g*, from where it again decreases to 50% at the wave length of about 700 millimicrons, as at *h*. It will be noted that the curve B, too, closely approaches a full sine wave across the visual spectrum.

The superimposed light transmission curves A and B of the respective media 11 and 12 form a wave-curve pattern much like that of a stationary wave, or better still, a pattern brought about by two sinusoidal or sine waves traveling in opposite directions, each wave being equal in length to that of one full sine wave; the two waves being of equal lengths, amplitudes and frequencies, in opposition and displaced in time one full wave length over the visual spectrum and relative to each other. The points of intersection on the X-axis, designated by *x*, *y* and *z*, partition off half wave lengths of curves A and B.

The resultant transmission curve C of the media 11, 12 which are represented by curves A and B is the light transmission curve of the neutral density filter. The form and location of curve C in the transmission field may be determined by the well known calculation, i.e., by multiplying the transmission values of both media, wave length by wave length, and then plotting the curve C.

By following the transmission percentages of curve C from left to right, one finds that the filter consisting of superimposed media 11, 12 transmits 25% (0.5×0.5) of light at the wave length of about 400 millimicrons, as indicated at *i*, the percentage of transmission decreasing to 21% at the wave length of about 475 millimicrons, as at *j*, whereupon increasing to 25% at the wave length of about 550 millimicrons, as at *k*, again decreasing to 21% at the wave length of about 625 millimicrons, as at *l*, and then increasing to 25% at the wave length of about 700 millimicrons, as at *m*.

As seen, the curve C which represents the transmission of the combined filter simulates two full sine waves across the transmission field. The length of each wave equals one-half the length of the curves-waves A, B of respective media 11, 12. The maxima of transmission 101, 102 and 103 in the transmission field have their dominant wave lengths in the violet region (400 millimicrons), green region (550 millimicrons), and in the red region (700 millimicrons) of the visual spectrum.

By analyzing the transmitted light in the field of Fig. 4, and supposing that the incident light is neutral or achromatic light, the transmitted light may be regarded as consisting of four batches, i. e., batches 100, 101, 102 and 103. The boundary between batch 100 and batches 101, 102, 103 is defined by a straight dot-dash line D parallel with a line of neutral transmission across the field.

Batch 101 corresponds to the area between line D and curve C up to the wave length of 475 millimicrons; batch 102 corresponds to the area between line D and curve C from 475 to 625 millimicrons; and batch 103 corresponds to the area between line D and curve C from 625 to 700 millimicrons.

As D is a straight line and parallel with a line of neutral transmission of the field, the light in the transmission field 100 below the line D may be regarded as neutral or achromatic light. The remaining batches 101, 102 and 103 represent the color stimuli of the field.

Batch 101 represents light whose dominant wave length is at about 400 millimicrons (violet); batch 102 represents light with the dominant wave length at about 550 millimicrons (green); and batch 103 represents light whose dominant wave length is at about 700 millimicrons (red). Batches 101 (violet) and 103 (red), when combined, result in purple light and form a batch equal in area and purity of stimulus to that of batch 102 of green light. As purple light and green light are complementary in color, the stimuli of batches 101, 102 and 103, when overlapping or added together, form achromatic light. Thus, batches 101, 102 and 103, when added together, are equivalent to achromatic light and the filter represented by the field is therefore of neutral density for achromatic light.

Although the transmitted light of such a filter is neutral to a very high degree, its neutral density is not perfect since spectrophotometric curves of media simulating perfect sine waves are not known, but filters of available material may be balanced to form filters whose neutral density is 99% if the incident light is achromatic. Mean noon sunlight in the summer months, or the equivalent thereof, is usually regarded as achromatic or neutral light.

Fig. 5 illustrates the transmission field of a filter composed of media having the same characteristics as media 11, 12 whose respective spectrophotometric transmission curves A and B are shown in Fig. 4, but the thickness of media shown in Fig. 5 is twice that of media 11, 12 which results in a denser filter transmitting less and absorbing more of the incident light than the filter of Fig. 4.

In Fig. 4, the curves A and B simulate exponentially undamped sine waves. The curves $A_1$ and $B_1$ in Fig. 5 are exponentially damped waves whose forms are determined by multiplying the transmission values of respective curves A and B by themselves, wave length by wave length, and then plotting the curves $A_1$, $B_1$ which now represent media whose thickness is twice that of media 11, 12. Thus, Fig. 4 represents a filter in which the density and colorimetric purity are on equal terms in each medium, and also of one medium with respect to the other, whereas Fig. 5 is illustrative of a filter in which the density and colorimetric purity are on different terms in each medium although equal in one medium with respect to the other medium. The density and the purity of color are greater in the media represented by curves $A_1$, $B_1$ than those of media 11, 12 which are represented by respective curves A and B in Fig. 4. Therefore, the maxima of transmission 201, 202, 203 in Fig. 5 are less pronounced, and the filter is denser as is indicated by the rather narrow batch 200.

The transmission field of Fig. 6 shows the curve pattern of a filter whose media are of a thickness which is twice that but otherwise having same qualities as those of media represented by curves $A_1$, $B_1$ in Fig. 5. The sinusoidal waves-curves $A_2$, $B_2$ are even more exponentially damped than the curves $A_1$, $B_1$; the maxima of transmission 301, 302, 303 are even less pronounced; and the represented filter is much denser, as is indicated by the extremely narrow batch 300.

It should be kept in mind that the curve patterns of media illustrated in Figs. 4, 5 or 6 represent neutral density filters for achromatic light.

Figs. 7, 8 and 9 illustrate three transmission fields with superimposed transmission curves representing filters whose media are of colors different from those represented by the curves in the fields of Figs. 4 to 6.

Curve $A_3$ in Fig. 7 represents a bluish-green medium, and curve $B_3$ a purplish-red medium, the two media forming a complementary pair; curve $A_4$ in Fig. 8 represents a green, and curve $B_4$ a purple medium as another complementary pair; finally, curve $A_5$ of Fig. 9 represents an orange-yellow and curve $B_5$ a purplish-blue medium which form still another complementary pair.

Theoretically, the position of each curve in the transmission fields of Figs. 7 to 9 and the positions of similar curves (not shown) which may be plotted between the curves $A_3$—$A_5$ and $B_3$—$B_5$, could be determined by sliding an extended curve pattern of the size and order shown in Fig. 4, i.e., curves A, B and C, across a transmission field of the visual spectrum. The crests of the spectrophotometric curves in form of simulated sinusoidal or sine waves of the media and the resultant transmission curves, respectively, designate complementary colors in the spectrum.

In Fig. 8, the complementary maxima of transmissions 501 and 502 are symmetric and complete; in Figs. 7 and 9, the missing color stimuli at one end of the spectrum are compensated for at the other end of the spectrum (batches 403 and 603, respectively), all due to the wave pattern of the transmission curves having the length of one full sine wave across the visual spectrum in order to cause the transmitted light to be achromatic. By two complete maxima are meant two batches which are equal in area (e.g., batches 501, 502 in Fig. 8), or one batch (e.g., batch 102 in Fig. 4) and two batches (101 and 103 in Fig. 4) which together form a batch equal in area to that of batch 102. The pattern of the curves, when sliding across the field of transmission, automatically achieves the proper complementary proportions.

It will be understood that the same result will be obtained—regarding complementary stimuli in different parts of the spectrum of radiant energy—with other curve patterns similar to those represented in Figs. 4 to 9.

The illustrated transmission curves $A_3$, $B_3$; $A_4$, $B_4$; and $A_5$, $B_5$ representing the media in Figs. 7 to 9 in that order, as well as those represented by curves A and B in Fig. 4, simulate full and exponentially undamped sine waves, i.e., the spectrophotometric curves of media having a certain thickness, the thicknesses depending on the concentration of the coloring matter in the media, and provide that the color stimuli and the density of the media be on equal terms and their complementary colors of equal colorimetric purity. But such filters may also be constructed of media whose spectrophotometric curves simulate exponentially damped sinusoidal waves in the manner illustrated in Figs. 5 and 6, by employing media of greater thicknesses in order to secure filters of greater density.

It will now be apparent that not all colored translucent media are suitable for the filters described herein. As stated, it is necessary that the spectrophotometric transmission curves of the media resemble either sinusoidal or sine waves of one wave length across the field of transmission of the spectral region involved, in order to achieve either two, or the equivalent of two, complementary maxima of transmission of substantially equal area in said field with their dominant wave lengths spaced the distance equaling one-half the length of said sinusoidal or sine waves. Solids whose transmission curves closely approach the desired form across the visual spectrum are, for example, sextant green glass of the Corning Glass Works; Schott's VG6, VG8 and VG9 glasses; some commercial grades of magenta, purplish-blue and orange-brown glasses; and a number of dyes.

If a single medium with a desirable curve of transmission is not available, two suitable elements in superimposition or, in case of dyes, mixtures of two dyes may be utilized in order to form such a curve.

Pairs of glasses which form such high-quality neutral density filters for the visual spectrum are selected pieces of #65H (blue-green) and #809H (magenta or purple) glasses of S. A. Bendheim Co., New York, and purplish-blue and orange-brown glasses found at times among the common commercial color glasses.

Because color glasses of the same type but of different melts vary in colorimetric purity and also with regard to their transmission curves, the above-given catalogue numbers of said glasses are not sufficiently reliable for the selection of glasses which form high-quality neutral density filters. A spectrophotometric determination of the transmission curves of the glasses, as well as of other media, is necessary.

Having once selected the media for the neutral density filter in accordance with the heretofore specified requirements, the usual manufacturing procedures are employed. Elements of glass are ground and polished substantially plano-parallel to a thickness providing the desired purity of color, and are then cut to size and form. Selected elements of gelatine and of plastics, the latter either selected or fashioned in accordance with the known methods, in order to secure substantially plano-parallel parts of the desired thickness, are then cut to the desired form and size.

When the filter elements are complete, they are superimposed upon each other. Glass elements may be cemented together by means of a suitable optical cement, fused together, if desired, or simply brought into contact. Selected gelatine elements are wetted, superimposed, pressed between polished glass plates and, after drying, used in form of sheets or between clear parallel glass plates. Plastic elements may be brought into contact or cemented together with materials suiting their compositions as is well known in the art.

If desired, the elements of my novel filter may be balanced for and mounted in spaced relationship from each other, or they may be used separately as complementary color filters of substantially equal colorimetric purity to either divide achromatic light into two stimuli or to form achromatic light from two stimuli.

Furthermore, there may be superimpositions between suitable elements of various media, for example, an element of glass may be combined with an element of gelatine or plastic if the spectrophotometric transmission curves of the media harmonize.

In mounting the filter for use, any suitable method may be employed.

What I claim and desire to protect by Letters Patent is:

1. A neutral density filter for substantially nonselective retardation of achromatic light and for feeble selective retardation of chromatic light in the visual spectrum, comprising two selectively absorbent filtering media, each of said media having a spectrophotometric curve approximating a sinusoidal or sine wave within and equal in length to that of the visual spectrum, said curves intersecting each other at half wave intervals on a line substantially parallel with a line of neutral transmission of the transmission field of the visual spectrum and being of substantially equal amplitudes and frequencies, in opposition and displaced in time one full wave length with respect to each other, the resultant transmission curve of said filter having two complete maxima of transmission with their dominant wave lengths spaced apart one-half the length of the visual spectrum.

2. The neutral density filter according to claim 1, wherein said media are of different thicknesses for balancing the color stimuli thereof.

3. The neutral density filter according to claim 1, wherein at least one of said media consists of at least two elements with the resultant transmission curve of said elements approximating one full sinusoidal or sine wave in the visual spectrum.

4. The neutral density filter according to claim 1, wherein said media are of glass.

5. The neutral density filter according to claim 1, wherein one of said media is of glass and the other of said media is selected from the group consisting of mixtures of dyes, gelatine, plastics and combinations thereof.

6. A filter according to claim 1, wherein said spectrophotometric curves of said media approximate exponentially damped sine waves.

7. A filter according to claim 1, wherein said media are superimposed upon each other.

8. A filter according to claim 1, wherein said media are spaced apart from each other.

9. A filter according to claim 1, wherein said resultant transmission curve defines a first complete maximum of transmission in one region of the visual spectrum with a first color stimulus, and two maxima of transmission in two other regions of the visual spectrum which together form a second complete maximum of transmission with a second color stimulus complementary to said first color stimulus, said stimuli interfering with and neutralizing each other.

10. A neutral density filter for substantially nonselective retardation of achromatic light and for feeble selective retardation of chromatic light across the visual spectrum, comprising two superimposed selectively absorbent, colored, translucent, isotropic media of different hues, each of said media having a spectrophotometric curve approximating a sinusoidal or sine wave within and equal in length to that of the visual spectrum, said curves intersecting each other at half wave intervals on a line substantially parallel with a line of neutral transmission of the transmission field of the visual spectrum and being of substantially equal amplitudes and frequencies, displaced in time one full wave length and in opposition with respect to each other, the resultant transmission curve of said filter having two complete maxima of transmission with their dominant wave lengths spaced apart one-half the length of the visual spectrum.

References Cited in the file of this patent

UNITED STATES PATENTS

| | | |
|---|---|---|
| 1,090,785 | Ives | Mar. 17, 1914 |
| 2,109,737 | Schlumbohm | Mar. 1, 1938 |
| 2,199,715 | Sauer | May 7, 1940 |
| 2,285,262 | Fess et al. | June 2, 1942 |
| 2,345,777 | Somers | Apr. 4, 1944 |
| 2,392,978 | Dimmick | Jan. 15, 1946 |
| 2,399,860 | Dimmick | May 7, 1946 |
| 2,519,545 | Colbert et al. | Aug. 22, 1950 |
| 2,543,793 | Marks | Mar. 6, 1951 |
| 2,600,962 | Billings | June 17, 1952 |

FOREIGN PATENTS

| | | |
|---|---|---|
| 245,336 | Great Britain | Jan. 7, 1926 |
| 745,509 | Germany | May 5, 1944 |